(12) United States Patent
Tanaya

(10) Patent No.: US 11,506,112 B1
(45) Date of Patent: Nov. 22, 2022

(54) CONTROL DEVICE AND CONTROL METHOD FOR INTERNAL COMBUSTION ENGINE

(71) Applicant: Mitsubishi Electric Corporation, Tokyo (JP)

(72) Inventor: Kimihiko Tanaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/678,316

(22) Filed: Feb. 23, 2022

(30) Foreign Application Priority Data

May 17, 2021 (JP) .............................. JP2021-082888

(51) Int. Cl.
*F02B 19/12* (2006.01)
*F02B 29/00* (2006.01)
*F02P 5/15* (2006.01)
*F02B 19/18* (2006.01)

(52) U.S. Cl.
CPC .............. *F02B 19/12* (2013.01); *F02B 19/18* (2013.01); *F02B 29/00* (2013.01); *F02P 5/1502* (2013.01)

(58) Field of Classification Search
CPC .......... F02B 19/12; F02B 19/18; F02B 29/00; F02P 5/1502; F02P 15/08; F02P 15/10
See application file for complete search history.

(56) References Cited

U.S. PATENT DOCUMENTS

| | | | |
|---|---|---|---|
| 10,947,948 B1 | 3/2021 | Glugla et al. | |
| 11,035,334 B1 * | 6/2021 | Cress | G01M 15/11 |
| 11,346,318 B2 * | 5/2022 | Glugla | F02P 5/145 |
| 2003/0136366 A1 * | 7/2003 | Herdin | F02P 23/04 372/71 |
| 2010/0206267 A1 * | 8/2010 | Glugla | F02D 35/021 701/102 |
| 2013/0098331 A1 * | 4/2013 | Woerner | F02P 13/00 123/260 |
| 2015/0075492 A1 * | 3/2015 | Glugla | F02P 5/1527 123/349 |

(Continued)

FOREIGN PATENT DOCUMENTS

| | | |
|---|---|---|
| JP | 2017-103179 A | 6/2017 |
| JP | 2019-190362 A | 10/2019 |

OTHER PUBLICATIONS

Office Action dated Jun. 21, 2022 in Japanese Application No. 2021-082888.

*Primary Examiner* — John M Zaleskas
(74) *Attorney, Agent, or Firm* — Sughrue Mion, PLLC; Richard C. Turner

(57) ABSTRACT

An object is to improve scavenging performance of a pre-combustion chamber connected to a main combustion chamber via an orifice and suppress reduction in combustion performance of an internal combustion engine. This control device for an internal combustion engine including a main combustion chamber and a pre-combustion chamber having at least one orifice between the pre-combustion chamber and the main combustion chamber, includes a first control device which controls operation of an ignition coil to generate spark discharge at a spark plug, thus combusting fuel gas, and a second control device which controls operation of the ignition coil at a timing other than the timing of combusting the fuel gas, to promote scavenging of the pre-combustion chamber.

10 Claims, 6 Drawing Sheets

(56) References Cited

U.S. PATENT DOCUMENTS

| | | | |
|---|---|---|---|
| 2016/0348569 A1* | 12/2016 | Kim | F02B 19/1023 |
| 2017/0074184 A1* | 3/2017 | Kim | F02P 15/08 |
| 2017/0122184 A1* | 5/2017 | Hampson | F02D 41/402 |
| 2017/0306917 A1* | 10/2017 | Kim | F02M 26/44 |
| 2017/0314456 A1* | 11/2017 | Blaxill | F02B 19/1028 |
| 2018/0010536 A1* | 1/2018 | Blaxill | F02N 19/06 |
| 2018/0128157 A1* | 5/2018 | VanDerWege | F02B 19/04 |
| 2018/0135506 A1* | 5/2018 | Grover, Jr. | H05H 1/2406 |
| 2021/0246823 A1* | 8/2021 | Glugla | F02B 19/12 |
| 2021/0246862 A1* | 8/2021 | Glugla | F02D 41/20 |
| 2021/0262408 A1* | 8/2021 | Glugla | F02D 41/3094 |
| 2022/0090552 A1* | 3/2022 | Yoneya | F02D 41/3094 |

\* cited by examiner

CONTROL DEVICE AND CONTROL METHOD FOR INTERNAL COMBUSTION ENGINE

BACKGROUND OF THE INVENTION

1. Field of the Invention

The present disclosure relates to a control device and a control method for an internal combustion engine.

2. Description of the Background Art

For addressing global warming having been raised as an issue in recent years, approaches to reduce greenhouse gases have begun worldwide. Also in the automobile industry, this issue needs to be addressed, and development is going on for improving efficiency of an internal combustion engine. As an example of configurations for improving efficiency of an internal combustion engine, there is a configuration called a pre-chamber type engine in which a pre-combustion chamber having an orifice is provided ahead of a spark plug, fuel in the pre-combustion chamber is ignited, and combustion flame is jetted from the orifice to a main combustion chamber, to ignite fuel in the main combustion chamber (see, for example, Patent Document 1). In this configuration, the fuel in the main combustion chamber can be rapidly ignited at multiple points, and therefore, even in a case of lean fuel, a combustion period can be shortened and stable operation can be performed. Accordingly, this configuration enables thermal efficiency to be significantly improved and enables the release amount of greenhouse gas to be significantly reduced, and thus has attracted attention in recent years.

Patent Document 1: Japanese Laid-Open Patent Publication No. 2017-103179

In the pre-chamber type engine, since the pre-combustion chamber is connected to the main combustion chamber via the orifice, there is a problem with scavenging performance, so that the burnt gas generated through combustion is likely to stay in the pre-combustion chamber. Due to staying of the burnt gas, a necessary amount of fuel cannot enter the inside of the pre-combustion chamber, so that combustion in the pre-combustion chamber is weakened. As a result, combustion flame jetted from the pre-combustion chamber is also weakened, thus causing a problem of reduction in combustion performance of the main combustion chamber and further, occurrence of misfire.

In order to solve this problem, for example, in Patent Document 1, the shapes and the positional relationship of a spark plug electrode part, the inside of the pre-combustion chamber, the orifice, and the like are adjusted and these are arranged precisely, thereby coping with the problem. However, there are various engine shapes and operation conditions, and deposition of carbon, wearing and deterioration of metal members, and the like can occur, whereby the states of the spark plug electrode and the inside of the pre-combustion chamber vary from moment to moment. Thus, there are limitations on measures that are based on only hardware.

SUMMARY OF THE INVENTION

The present disclosure has been made to solve the above problem, and an object of the present disclosure is to provide a control device and a control method for an internal combustion engine that are configured to be able to efficiently exhaust and scavenge burnt gas and the like staying in a pre-combustion chamber to the outside of the pre-combustion chamber, thereby suppressing reduction in combustion performance of an internal combustion engine having such a pre-combustion chamber.

A control device for an internal combustion engine according to the present disclosure is a control device for an internal combustion engine including a pre-combustion chamber having at least one orifice, a spark plug located at the pre-combustion chamber, an ignition coil for providing high voltage to the spark plug, and a main combustion chamber to which combustion flame is jetted from the orifice, the combustion flame being obtained through combustion of fuel gas introduced into the pre-combustion chamber by spark discharge generated at the spark plug with the high voltage provided from the ignition coil, the control device being for controlling operation of the ignition coil of the internal combustion engine, the control device including: a first control device which controls operation of the ignition coil to generate the spark discharge at the spark plug, thus combusting the fuel gas; and a second control device which controls operation of the ignition coil at a timing other than an operation timing of the ignition coil by the first control device, to promote scavenging of the pre-combustion chamber.

In the control device and the control method for the internal combustion engine according to the present disclosure, burnt gas and the like staying in the pre-combustion chamber can be efficiently exhausted and scavenged to the outside of the pre-combustion chamber, thereby suppressing reduction in combustion performance of the internal combustion engine having the pre-combustion chamber.

DETAILED DESCRIPTION OF THE PREFERRED EMBODIMENTS OF THE INVENTION

Figure 1:
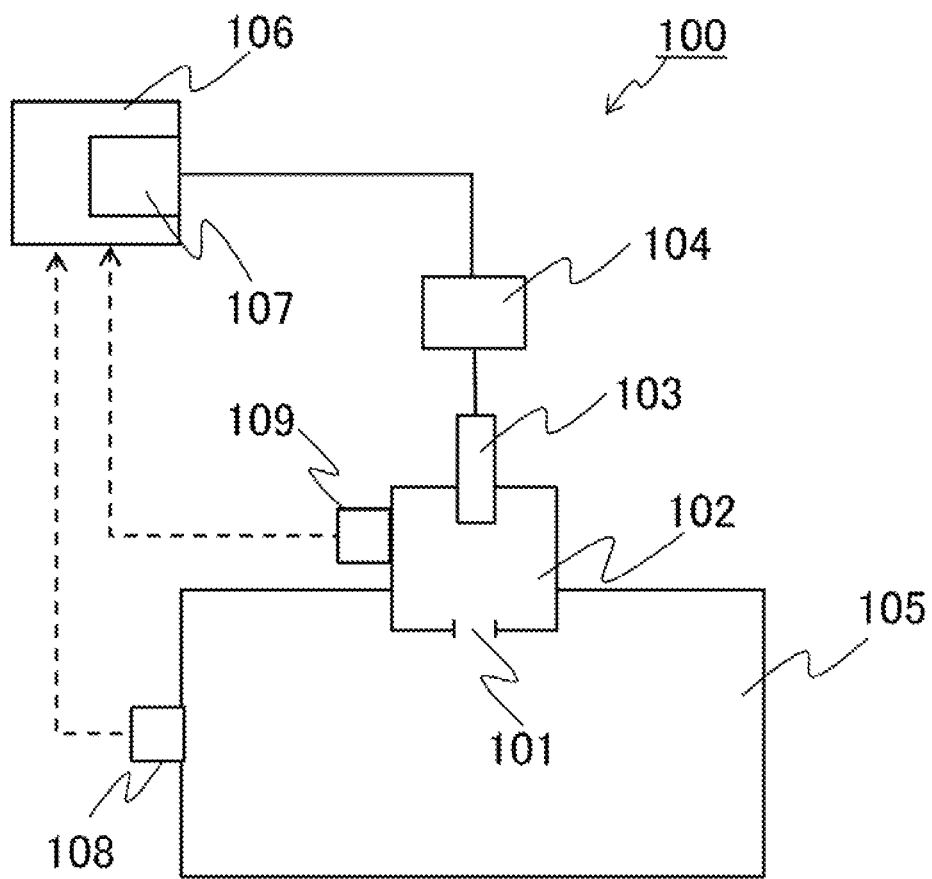
FIG. 1 is a schematic configuration diagram of an internal combustion engine according to the first embodiment of the present disclosure.

Hereinafter, embodiments of a control device for an internal combustion engine according to the present disclosure will be described with reference to the drawings. In the drawings, the same reference characters denote the same or corresponding parts. Here, an engine is described as an example of the internal combustion engine.

First Embodiment

Hereinafter, an internal combustion engine (engine) according to the first embodiment of the present disclosure will be described with reference to the drawings.

FIG. 1 is a schematic configuration diagram of the internal combustion engine according to the first embodiment. In FIG. 1, an internal combustion engine 100 includes: a main combustion chamber 105; a pre-combustion chamber 102 having, between the pre-combustion chamber 102 and the main combustion chamber 105, at least one orifice 101 communicating with the main combustion chamber 105; a spark plug 103 which is located in the pre-combustion chamber 102 and has an electrode (not shown), and which generates spark discharge between the electrode and a ground electrode by high voltage applied; an ignition coil 104 for providing high voltage to the spark plug 103; a first control device 106 which controls operation of the ignition coil 104 to generate spark discharge at the spark plug 103; and a second control device 107 which controls operation of the ignition coil 104 to cause discharge at the spark plug 103 so as to promote scavenging of burnt gas in the pre-combustion chamber 102. In the present embodiment, combustion gas in the pre-combustion chamber 102 is ignited by spark discharge at the spark plug 103, and combustion flame grows and rises in the pre-combustion chamber 102. Then, the combustion flame jetted from the orifice 101 causes combustion in the main combustion chamber 105.

The main combustion chamber 105 has an intake port connected to an intake pipe, an exhaust port connected to an exhaust pipe, and a movable piston connected to a rod linked with a crankshaft and producing output. However, these are not shown in FIG. 1. In addition, the main combustion chamber 105 and the pre-combustion chamber 102 are provided with various types of sensors, switches, actuators, and the like, which are connected to and controlled by the first and second control devices 106 and 107. In FIG. 1, a sensor 108 is shown as an example of the sensor provided to the main combustion chamber 105, and a sensor 109 is shown as an example of the sensor provided to the pre-combustion chamber 102. For example, one of the sensors 108 is a crank angle sensor, and one of the sensors 109 is a temperature sensor such as a thermistor, as described later.

The number of orifices 101 provided to the pre-combustion chamber 102 for jetting combustion flame to the main combustion chamber 105 is not limited to one, and a plurality of orifices 101 may be provided. In general, in a pre-chamber type engine, such orifices 101 are provided at three to eight locations. Pre-chamber type engines include an active type in which a fuel injection device is provided to a pre-combustion chamber and fuel is directly injected into the pre-combustion chamber, and a passive type in which a fuel injection device is not provided to a pre-combustion chamber and fuel injected into a main combustion chamber is introduced into the pre-combustion chamber by means of a pressure difference between the main combustion chamber and the pre-combustion chamber. In the present embodiment, either type may be applied. That is, either type may be applied as long as fuel is introduced into the pre-combustion chamber 102. The fuel gas is air-fuel mixture.

A spark plug may be provided also to the main combustion chamber 105, in addition to the pre-combustion chamber 102. In this case, in the present embodiment, the second control device 107 controls the spark plug 103 provided to the pre-combustion chamber 102 and the ignition coil 104 connected thereto.

Figure 2:
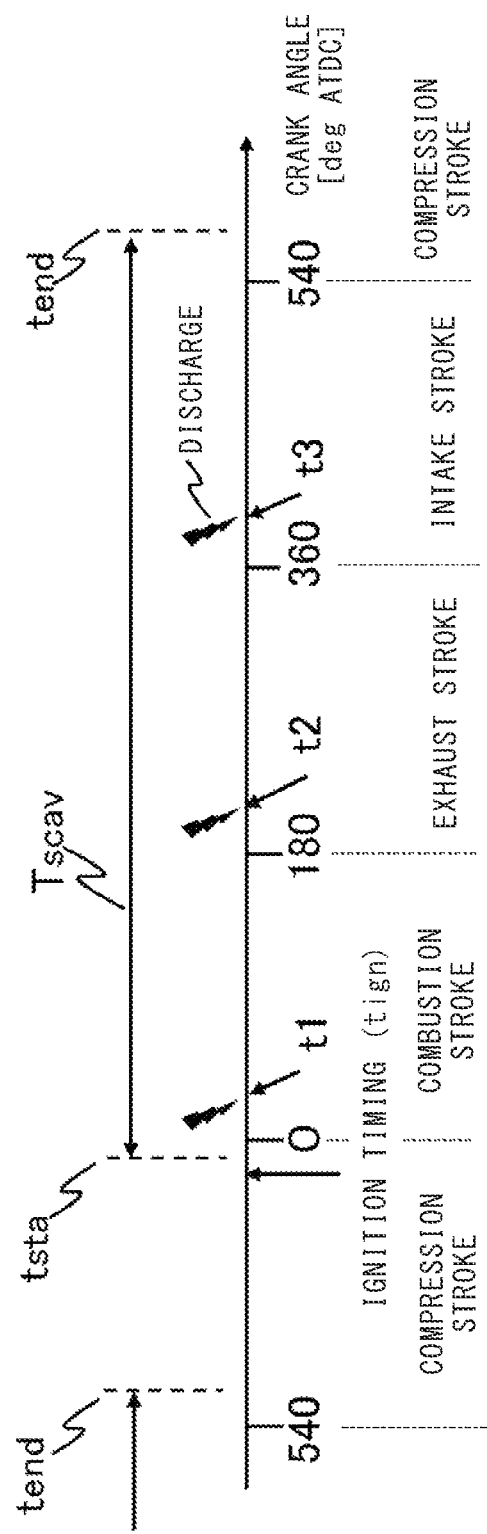
FIG. 2 illustrates operation periods of a control device according to the first embodiment.

FIG. 2 illustrates operations of the first and second control devices 106 and 107 associated with the crank angle of a crankshaft (not shown) which operates a piston (not shown). Normally, the state of the internal combustion engine is represented by the crank angle. In FIG. 2, a crank angle 0 [deg ATDC] is the top dead center, and the ignition timing is set to be slightly before the top dead center in consideration of time lag. When ignition has been made, a combustion stroke is performed. Then, the burnt gas, which does not burn again, is exhausted (exhaust stroke), fuel gas is sucked again (intake stroke), and the crank angle becomes the top dead center from the bottom dead center (crank angle 360) so that the fuel gas is compressed (compression stroke).

[Operation of Internal Combustion Engine by First Control Device 106]

Operation of the ignition coil 104 is controlled by the first control device 106, whereby the ignition timing, i.e., the timing of spark discharge of the spark plug 103, is controlled. Various types of sensors, switches, actuators, and the like (not shown) are connected to the first control device 106. For example, by a signal from the crank angle sensor, operation of the ignition coil 104 is controlled so that the timing of spark discharge (ignition timing) comes slightly before the crank angle 0 [deg ATDC]. Specifically, the first control device 106 generates an ignition signal for controlling operation of the ignition coil 104. In a state in which the ignition signal is high, the ignition coil 104 is energized, and at a timing when the ignition signal is switched from high to low, the ignition coil 104 generates high voltage and provides the high voltage to the spark plug 103.

In the present embodiment, at the ignition timing shown in FIG. 2, combustion occurs in the pre-combustion chamber 102, and combustion flame jetted through the orifice 101 to the main combustion chamber 105 causes combustion.

In each stroke of the internal combustion engine, the first control device 106 controls the various types of sensors, switches, actuators, and the like (not shown), to control opening/closing of various types of valves, supply of fuel gas, and the like.

[Operation of Internal Combustion Engine by Second Control Device 107]

In order to promote scavenging of burnt gas in the pre-combustion chamber 102, the second control device 107 issues an ignition signal to the ignition coil 104 so as to output high voltage, thereby generating spark discharge in the discharge gap of the spark plug 103 located in the pre-combustion chamber 102.

Hereafter, a case where the ignition coil 104 is a flyback type is described as an example. Therefore, as described also in the first control device 106, in a state in which the ignition signal is high, the ignition coil 104 is energized, and at a timing when the ignition signal is switched from high to low, the ignition coil 104 generates high voltage. If the spark plug 103 is connected thereto, dielectric breakdown occurs (in the discharge gap) between the high-voltage electrode and the ground electrode of the spark plug, whereby spark discharge is generated.

When spark discharge is generated in the discharge gap of the spark plug 103, high heat due to the discharge is sharply generated, so that a shock wave and a pressure wave arise. Such a wave is weak, but in the case of the pre-combustion chamber 102 having a volume not greater than $1 \times 10^{-6}$ [m$^3$], can cause slight disturbance therein. Thus, the burnt gas staying in the pre-combustion chamber 102 can also be disturbed and moved, whereby scavenging of the burnt gas can be promoted.

The spark discharge for promoting scavenging is generated in a condition in which there is almost no fresh fuel in the pre-combustion chamber 102. For example, the spark discharge may be generated in a scavenging period $T_{scav}$ shown in FIG. 2. A timing $t_{sta}$ which is the start of the scavenging period $T_{scav}$ is a timing after an ignition timing $t_{ign}$ of igniting the fuel gas in the pre-combustion chamber 102 to cause combustion, without including the ignition timing $t_{ign}$. A timing $t_{end}$ which is the end of the period is a timing that is shortly after the start of the compression stroke and that is before a sufficient amount of fresh fuel is supplied into the pre-combustion chamber 102.

The second control device 107 may determine the number of times the spark discharge (hereinafter, referred to as scavenging promotion discharge) is generated for promoting scavenging within the scavenging period $T_{scav}$, through matching evaluation or the like in advance, and may change the number of times in accordance with the operation condition. For example, in a high-load operation condition in which the intake air pressure exceeds 70 [kPa], the scavenging performance is originally high. Therefore, the scavenging promotion discharge may not necessarily be generated and the number of times of the scavenging promotion discharge may be zero. In a low-load operation condition in which the intake air pressure is lower than 30 [kPa], the scavenging performance is low. Therefore, the scavenging promotion discharge may be generated 15 times, for example. As the engine load becomes higher or as the engine rotation speed becomes higher, the scavenging performance becomes higher and therefore the number of times of the scavenging promotion discharge may be decreased accordingly.

The timings of generating the scavenging promotion discharge and the intervals of the scavenging promotion discharge may be determined as appropriate within the scavenging period $T_{scav}$, and optimum timings and intervals may be sought and determined for each operation condition through matching evaluation or the like in advance. In the present embodiment, as an example, it is assumed that the scavenging promotion discharge is generated five times near 20 [deg ATDC] at a timing t1 when the pressure in the pre-combustion chamber 102 shifts to the decreasing direction, five times near 200 [deg ATDC] at a timing t2 after an exhaust valve is opened, and five times near 380 [deg ATDC] at a timing t3 after an intake valve is opened, and the following description will be given under this assumption.

The intervals at which the scavenging promotion discharge is generated may be set in accordance with the cycle represented by the natural frequency in the pre-combustion chamber 102. In this case, the pressure wave can be effectively amplified owing to a resonance effect, whereby disturbance can be more efficiently caused in the pre-combustion chamber 102 and thus scavenging can be more promoted.

For example, it is assumed that the inner shape of the pre-combustion chamber 102 is cylindrical and the inner diameter is 12 [mm]. Near the timing t2, the burnt gas having a high temperature still remains, and therefore the temperature in the pre-combustion chamber 102 is high to a certain extent, and the natural frequency of ρ10 mode is about 33 [kHz] (ρ10 mode: a resonance mode in which the circumferential-direction frequency of the pre-combustion chamber 102 is a first order, i.e., a state of being divided into two along the diameter). The natural frequency may be actually measured or may be calculated using a well-known Draper's formula or the like. In the case where the frequency is 33 [kHz], one cycle is about 30 [μsec], and the interval of the one cycle is hereafter referred to as basic interval.

Hereinafter, an example of operation in which the second control device 107 operates the ignition coil 104 to promote scavenging in the pre-combustion chamber 102 will be specifically described with reference to FIG. 3 to FIG. 6.

FIG. 3 to FIG. 6 show discharge patterns when the scavenging promotion discharge is generated five times near the timing t2 in FIG. 2. In these figures, an ignition signal is a signal transmitted from the second control device 107 to the ignition coil 104, and at the timing t2 when the ignition signal is switched from high (H) to low (L), the ignition coil 104 generates high voltage and provides the high voltage to the spark plug 103. In addition, discharge voltage is voltage applied to the spark plug 103, and each time of occurrence of dielectric breakdown $D_{break}$ when the high voltage is applied is counted as one time.

Figure 3:
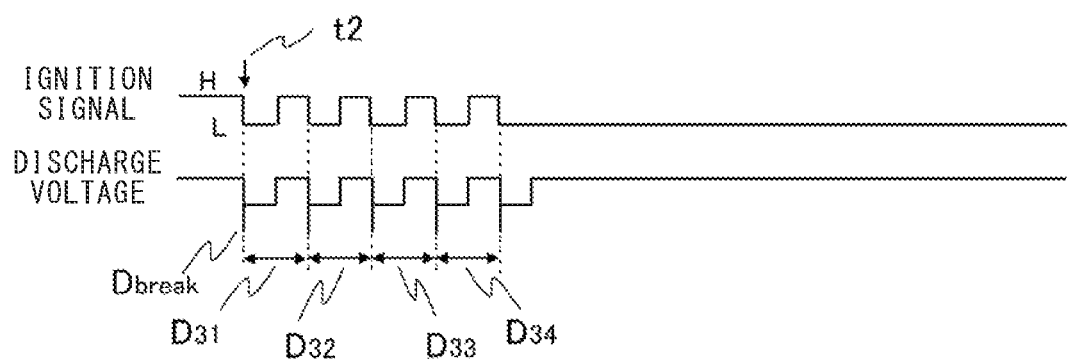
FIG. 3 shows an operation example of the control device according to the first embodiment.

In a case where the scavenging promotion discharge is generated five times near the timing t2, as shown in FIG. 3, if discharge intervals $D_{31}$ to $D_{34}$ are all set to about 30 [μsec] which is the basic interval, disturbance can be efficiently caused in the pre-combustion chamber 102 using resonance, whereby the scavenging performance can be improved.

Figure 4:
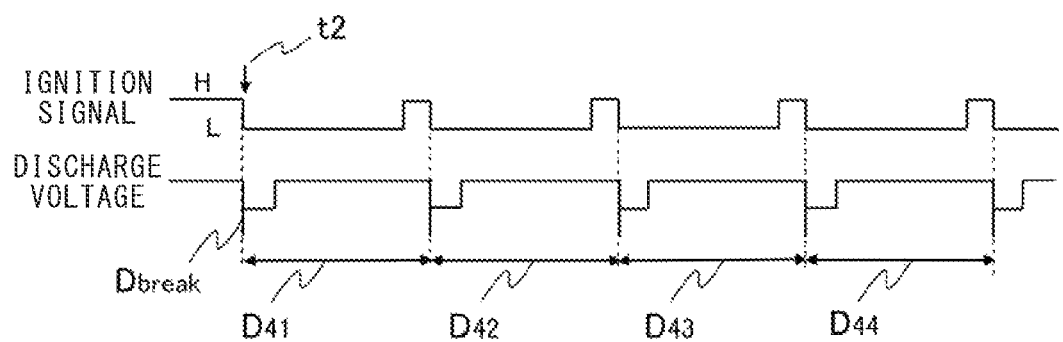
FIG. 4 shows another operation example of the control device according to the first embodiment.

Alternatively, in a case where the scavenging promotion discharge is generated five times near the timing t2, the discharge intervals may be set to an interval obtained by multiplying the basic interval. For example, as shown in FIG. 4, discharge intervals $D_{41}$ to $D_{44}$ may be all set to about 90 [μsec] which is three times the basic interval, whereby a resonance effect can be caused similarly. Although the pressure wave amplifying effect by resonance is slightly reduced, heat generation of the ignition coil 104 can be suppressed. The multiplication value for the basic interval is not limited to three.

Figure 5:
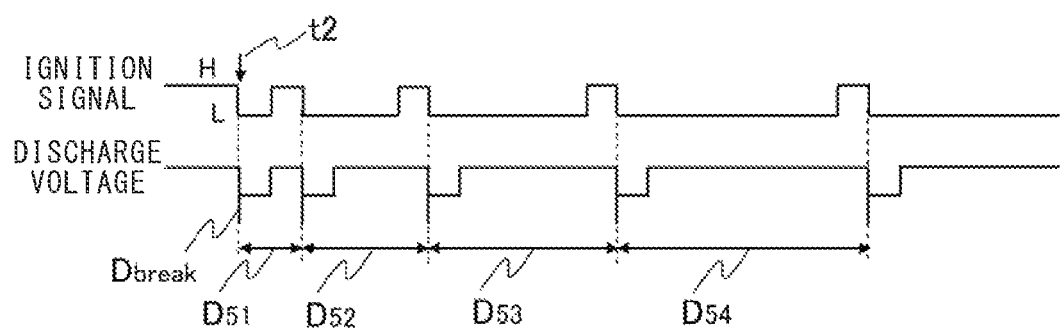
FIG. 5 shows still another operation example of the control device according to the first embodiment.

The discharge intervals may not necessarily be set using an equal multiplication value for the basic interval. For example, as shown in FIG. 5, a discharge interval $D_{51}$ between the first time and the second time may be set to 30 [μsec] which is the basic interval, a discharge interval $D_{52}$ between the second time and the third time may be set to 60 [μsec] which is two times the basic interval, a discharge interval $D_{53}$ between the third time and the fourth time may be set to 90 [μsec] which is three times the basic interval, and a discharge interval $D_{54}$ between the fourth time and the fifth time may be set to 150 [μsec] which is five times the basic interval. In this way, the pressure wave is quickly amplified using a resonance effect in the beginning, and then the discharge intervals are expanded toward the later stage where there is an influence of heat generation due to discharge, whereby disturbance can be effectively provided in the pre-combustion chamber 102 while the load on the ignition coil 104 is reduced.

The natural frequency in the pre-combustion chamber 102 depends on the temperature in the pre-combustion chamber 102. Therefore, by changing the basic interval in accordance with the temperature condition in the pre-combustion chamber, disturbance can be caused more efficiently.

In a case where the inner diameter of the inside of the pre-combustion chamber 102 is 12 [mm] as described above, since combustion flame is present near the timing t1 in the combustion stroke, the temperature in the pre-combustion chamber 102 is extremely high, and the ρ10 natural frequency is about 45 [kHz] and the basic interval is 22 [μsec]. Near the timing t3 in the intake stroke, exhausting of the burnt gas is almost completed and suction of fresh gas has begun. Therefore, the temperature in the pre-combustion chamber 102 is comparatively low, and the natural frequency in ρ10 mode is about 18 [kHz] and the basic interval is about 55 [μsec]. That is, at the timing t1 in the combustion stroke, the basic interval is smaller than that at the timing t2 in the exhaust stroke, and at the timing t3 in the intake stroke, the basic interval is greater than that at the timing t2 in the exhaust stroke.

In this way, the value of the basic interval may be selected in accordance with the timing of generating the scavenging promotion discharge, and the scavenging promotion discharge may be generated a necessary number of times at intervals that are multiples of the selected value of the basic interval. That is, the timings of generating the scavenging promotion discharge in the scavenging period $T_{scav}$, the intervals of the scavenging promotion discharge, and the number of times thereof may be determined in advance for each operation condition of the internal combustion engine through matching evaluation or the like, and may be stored as a table of scavenging promotion discharge conditions.

Figure 6:
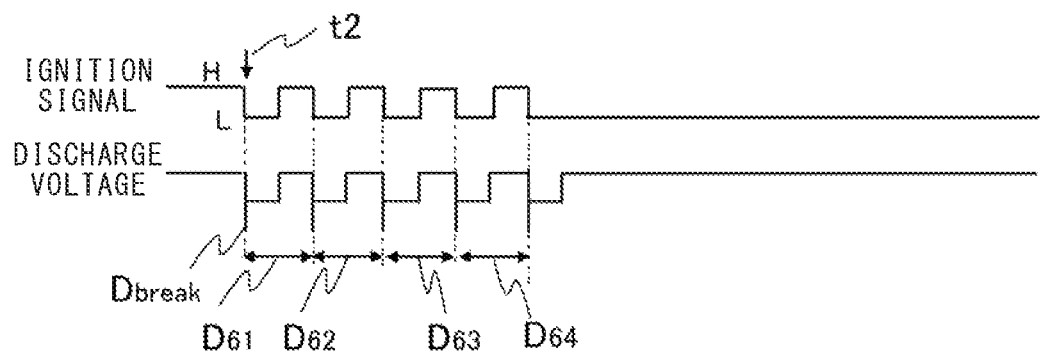
FIG. 6 shows still another operation example of the control device according to the first embodiment.

Further, even during the same stroke, the temperature in the pre-combustion chamber 102 changes from moment to moment. Principally, the temperature changes in a decreasing direction, and therefore the basic interval may be finely adjusted as appropriate. For example, in a case where the scavenging promotion discharge is generated five times near the timing t2, instead of setting all the discharge intervals $D_{31}$ to $D_{34}$ to about 30 [μsec] which is the basic interval as shown in FIG. 3, the discharge intervals are finely adjusted in a direction to expand on a 1 [μsec] basis each time, e.g., a discharge interval $D_{61}$ is 30 [μsec], a discharge interval $D_{62}$ is 31 [μsec], a discharge interval $D_{63}$ is 32 [μsec], and a discharge interval $D_{64}$ is 33 [μsec], as shown in FIG. 6. Thus, by expanding the discharge intervals with elapse of time, disturbance can be more effectively provided in the pre-combustion chamber 102 while the load of the ignition coil 104 is reduced. In addition, in a case where the temperature in the pre-combustion chamber 102 can be measured by the sensor 109, the discharge intervals may be expanded in accordance with the reduction rate of the measured temperature.

In the above description, the case of ρ10 mode has been shown as an example of natural vibration. However, the vibration mode that readily occurs differs depending on the shape in the pre-combustion chamber 102. Therefore, depending on the shape in the pre-combustion chamber 102, for example, ρ20 mode (a resonance mode in which the circumferential-direction frequency of the pre-combustion chamber 102 is a second order), ρ01 mode (a resonance mode in which the radial-direction frequency of the pre-combustion chamber 102 is a first order, i.e., a state of being divided into two concentrically), ρ11 mode (a resonance mode in which the circumferential-direction frequency of the pre-combustion chamber 102 is a first order and the radial-direction frequency thereof is a first order), or the like may be selected, whereby the same effects can be obtained.

Next, the procedure of ignition operation by the control device for the internal combustion engine according to the present embodiment will be described with reference to FIG. 7 and FIG. 8.

Figure 7:
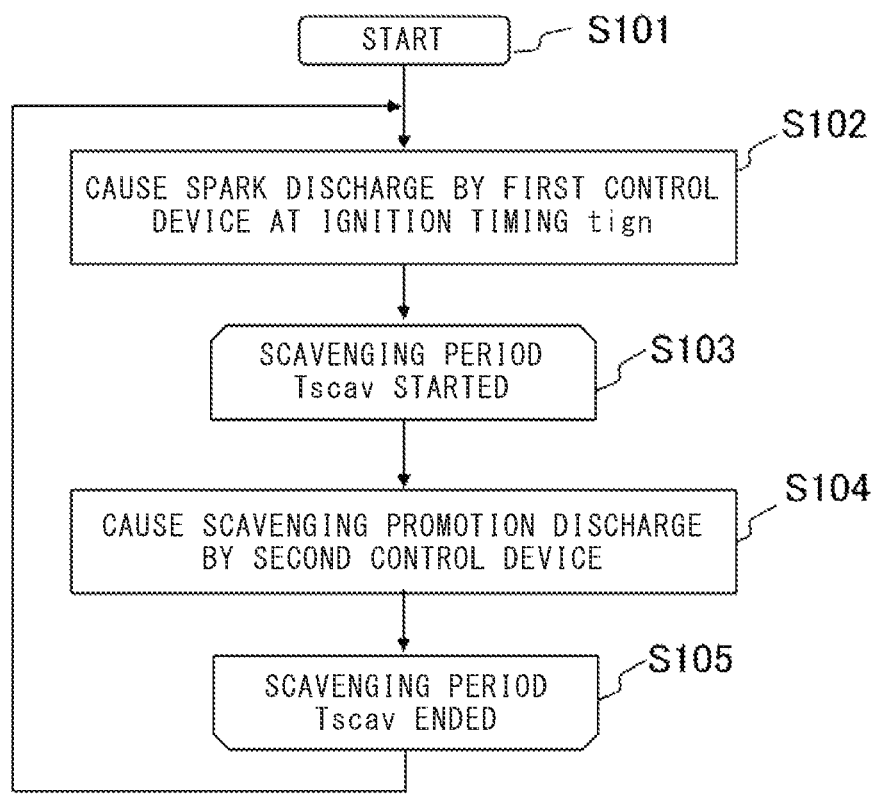
FIG. 7 is a flowchart showing an operation procedure of the control device according to the first embodiment.

First, in FIG. 7, operation of the internal combustion engine is started (step S101), and fuel gas is introduced into the pre-combustion chamber 102. In the ignition timing $t_{ign}$, the ignition coil 104 is operated by the ignition signal from the first control device 106, so that spark discharge occurs at the spark plug 103, the fuel gas is combusted in the pre-combustion chamber 102, and combustion flame is jetted from the orifice 101 to the main combustion chamber 105 (step S102). When the combustion flame has been jetted from the pre-combustion chamber 102 to the main combustion chamber 105, there is almost no fresh fuel in the pre-combustion chamber 102. When the scavenging period $T_{scav}$ is started (step S103), the second control device 107 controls the ignition coil 104 to cause the scavenging promotion discharge (step S104). The timing $t_{end}$ which is the end of the period is a timing that is shortly after the start of the next compression stroke and that is before a sufficient amount of fresh fuel is supplied into the pre-combustion chamber 102. When the scavenging period $T_{scav}$ is ended (step S105), discharge by the second control device 107 does not occur.

Figure 8:
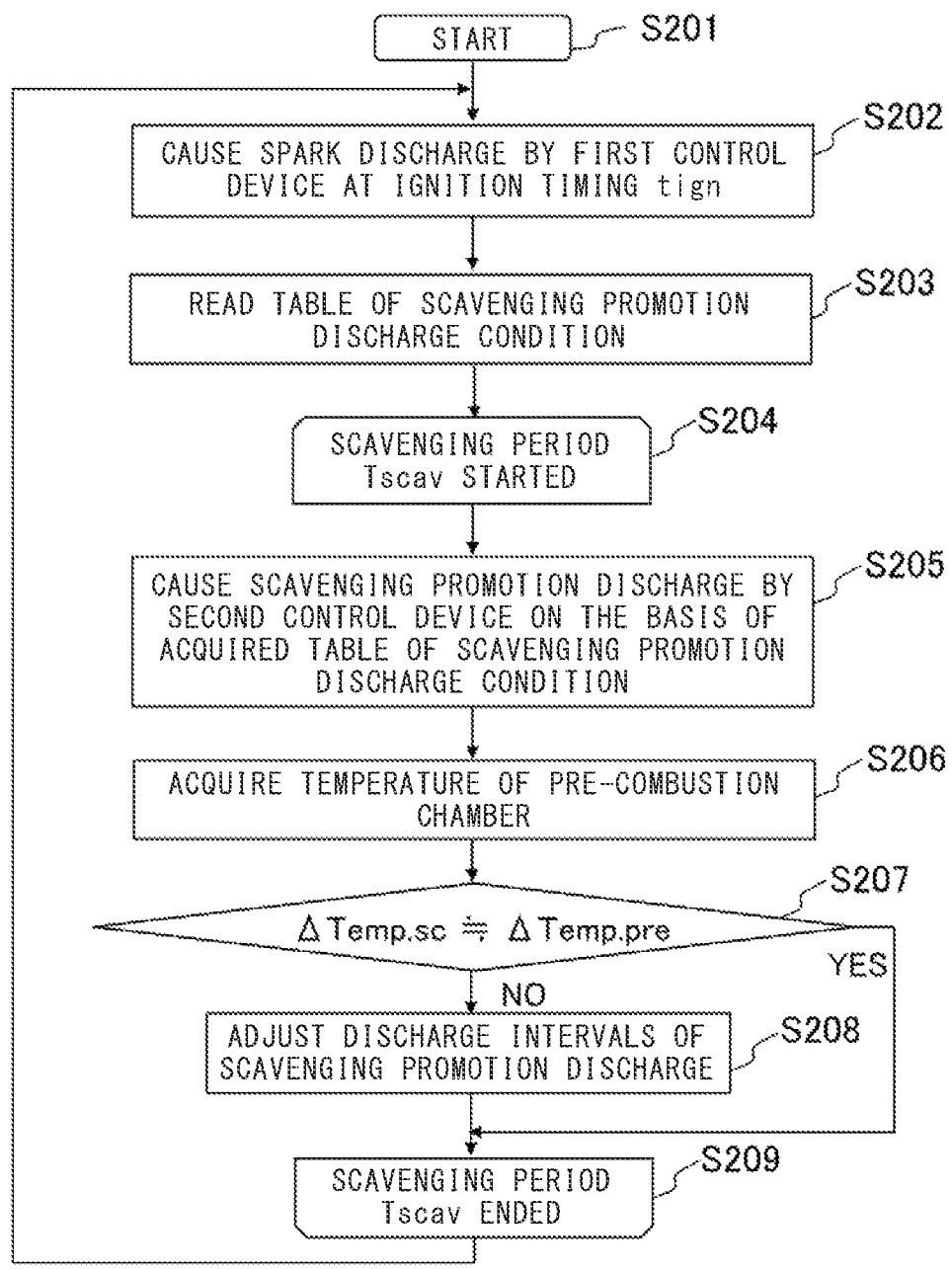
FIG. 8 is a flowchart showing another operation procedure of the control device according to the first embodiment.

FIG. 8 shows the procedure of ignition operation in a case where the conditions of scavenging promotion discharges by the second control device 107 are determined in advance through matching evaluation or the like and are stored as a scavenging promotion discharge condition table.

As in the case of FIG. 7, operation of the internal combustion engine is started (step S201), and fuel gas is introduced into the pre-combustion chamber 102. In the ignition timing $t_{ign}$, the ignition coil 104 is operated by an ignition signal from the first control device 106, so that spark discharge occurs at the spark plug 103, the fuel gas is combusted in the pre-combustion chamber 102, and combustion flame is jetted from the orifice 101 to the main combustion chamber 105 (step S202).

Before the scavenging period $T_{scav}$, the second control device 107 reads the scavenging promotion discharge condition table determined in advance (step S203). This step may be performed before step S202. When the scavenging period $T_{scav}$ is started (step S204), the second control device 107 generates an ignition signal on the basis of the acquired scavenging promotion discharge condition table and controls the ignition coil 104 to cause the scavenging promotion discharge at the spark plug 103 (step S205). Although the timings of the scavenging promotion discharge in the scavenging period $T_{scav}$ have been determined by the scavenging promotion discharge condition table, the temperature of the pre-combustion chamber 102 is acquired (step S206), and a reduction rate ΔTemp.sc of the temperature is calculated from the acquired temperature. If the reduction rate of the temperature is different from a predicted value ΔTemp.pre thereof (NO in step S207), the discharge intervals based on the timing table are adjusted (step S208). If the reduction rate ΔTemp.sc of the temperature and the predicted value ΔTemp.pre of the reduction rate of the temperature are equal or approximately equal to each other, the discharge intervals are not changed. Regarding whether or not to adjust the discharge intervals, a threshold may be determined in advance for the difference between the reduction rate ΔTemp.sc of the temperature and the predicted value ΔTemp.pre of the reduction rate of the temperature. If the scavenging period $T_{scav}$ is ended (step S209), discharge by the second control device 107 does not occur.

Instead of steps S206 and S207, the discharge intervals may be expanded with elapse of time from the start of the scavenging promotion discharge as described above, and the discharge intervals may be adjusted in step S208. The scavenging promotion discharge condition table may be set to have a condition for expanding the discharge intervals with elapse of time, in advance. That is, the discharge intervals of the scavenging promotion discharge may be adjusted in accordance with the temperature of the pre-combustion chamber.

[Hardware Configuration of Control Devices 106 and 107]

Next, the hardware configuration of the control devices will be described with reference to FIG. 9.

Figure 9:
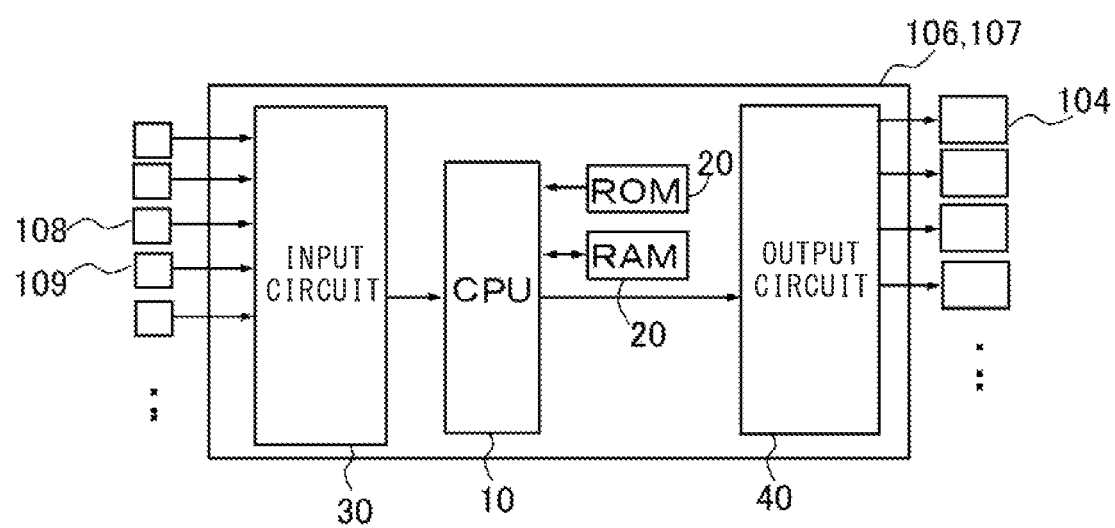
FIG. 9 is a hardware configuration diagram of the control device according to the first embodiment.

FIG. 9 is a hardware configuration diagram of the first and second control devices 106 and 107 according to the present embodiment. The first and second control devices 106 and 107 are control devices for controlling at least the ignition coil 104. Various functions of the first and second control devices 106 and 107 are implemented by a processing circuit that the first and second control devices 106 and 107 have. Specifically, as shown in FIG. 9, the first and second control devices 106 and 107 include, as the processing circuit, an arithmetic processing unit 10 (computer) such as a central processing unit (CPU), a storage device 20 for passing/receiving data to/from the arithmetic processing unit 10, an input circuit 30 for inputting external signals to the arithmetic processing unit 10, an output circuit 40 for outputting signals from the arithmetic processing unit 10 to the outside, and the like.

As the arithmetic processing unit 10, an application specific integrated circuit (ASIC), an integrated circuit (IC), a digital signal processor (DSP), a field programmable gate array (FPGA), various logic circuits, various signal processing circuits, and the like may be provided. A plurality of the arithmetic processing units 10 of the same type or different types may be provided to execute each process in a divided manner. As the storage device 20, a random access memory (RAM) configured such that data can be read and written by the arithmetic processing unit 10, a read only memory (ROM) configured such that data can be read by the arithmetic processing unit 10, and the like are provided. Various sensors such as a crank angle sensor, a cam angle sensor, an intake amount detection sensor, a water temperature sensor, a power supply voltage sensor, and an ion current detection circuit, and switches (e.g., sensors 108, 109 in FIG. 1), are connected to the input circuit 30. The input circuit 30 includes an A/D converter for inputting output signals from these sensors and switches to the arithmetic processing unit 10, and the like. Electric loads such as the ignition coil 104 are connected to the output circuit 40, and the output circuit 40 includes a driving circuit for converting a control signal from the arithmetic processing unit 10 and outputting the converted signal to these electric loads, and the like.

The various functions of the first and second control devices 106 and 107 are implemented by the arithmetic processing unit 10 executing software (program) stored in the storage device 20 such as the ROM and cooperating with other hardware components of the first and second control devices 106 and 107 such as the storage device 20, the input circuit 30, and the output circuit 40. The set data such as a threshold and a determination value, and the scavenging promotion discharge condition table, to be used by the first and second control devices 106 and 107, are stored as a part of software (program) in the storage device 20 such as the ROM. Each function of the first and second control devices 106 and 107 may be implemented by a software module or may be implemented by a combination of software and hardware.

The second control device 107 may be an independent module or the like separate from the first control device 106, or may be provided in the first control device 106, i.e., may be formed as a module integrated by providing them in the same package.

The function of the second control device 107 may be implemented as software in the first control device 106 having the above-described computer, so as to configure a scavenging promoting device or a scavenging promoting function. Thus, the device configuration can be simplified and the scavenging promoting function can be realized at low cost.

As described above, according to the present embodiment, scavenging discharge is performed for exhausting, to the outside of the pre-combustion chamber, burnt gas and the like staying in the pre-combustion chamber after combustion of fuel gas. Thus, it becomes possible to efficiently exhaust and scavenge the burnt gas and the like staying in the pre-combustion chamber to the outside of the pre-combustion chamber, thereby suppressing reduction in combustion performance of the internal combustion engine having the pre-combustion chamber. Since the engine can be stably operated with a thermally efficient condition using the pre-combustion chamber, the amount of greenhouse gas released from the internal combustion engine is reduced, thus contributing to environmental preservation.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 100 internal combustion engine
101 orifice
102 pre-combustion chamber
103 spark plug
104 ignition coil
105 main combustion chamber
106 first control device
107 second control device
108 sensor
109 sensor
$T_{scav}$ scavenging period
$t_{sta}$ timing (start of scavenging period)
$t_{ign}$ ignition timing
$t_{end}$ timing (end of scavenging period)

What is claimed is:

1. A control device for an internal combustion engine including a pre-combustion chamber having at least one orifice, a spark plug located at the pre-combustion chamber, an ignition coil for providing high voltage to the spark plug, and a main combustion chamber to which combustion flame is jetted from the at least one orifice, the combustion flame being obtained through combustion of fuel gas introduced into the pre-combustion chamber by spark discharge generated at the spark plug with the high voltage provided from the ignition coil, the control device being for controlling an operation of the ignition coil of the internal combustion engine, the control device comprising:

a first processor which controls operation of the ignition coil to generate the spark discharge at the spark plug, thus combusting the fuel gas, at a first operation timing of the ignition coil; and a second processor which controls operation of the ignition coil at a second operation timing to promote scavenging of the pre-combustion chamber, using intervals of scavenging promotion discharge set in accordance with a cycle of a natural frequency of the pre-combustion chamber.

2. The control device for the internal combustion engine according to claim 1, wherein
the first processor and the second processor are provided in a same package.

3. The control device for the internal combustion engine according to claim 1, wherein
the second operation timing of the ignition coil occur after the first operation timing of the ignition coil and before the fuel gas is next introduced into the pre-combustion chamber.

4. The control device for the internal combustion engine according to claim 3, wherein
at the second operation timing, the second processor uses a first table including timings and intervals of the scavenging promotion discharge set in advance in association with an operation condition of the internal combustion engine, and controls the operation of the ignition coil in accordance with the first table.

5. The control device for the internal combustion engine according to claim 4, wherein
at the second operation timing, the second processor uses a second table of the number of times of the scavenging promotion discharge set in advance in association with the operation condition of the internal combustion engine, and controls the operation of the ignition coil in accordance with the number of times of the scavenging promotion discharge in the second table.

6. The control device for the internal combustion engine according to claim 3, wherein
at the second operation timing, the second processor uses a second table of the number of times of the scavenging promotion discharge set in advance in association with an operation condition of the internal combustion engine, and controls the operation of the ignition coil in accordance with the number of times of the scavenging promotion discharge in the second table.

7. The control device for the internal combustion engine according to claim 1, wherein
at the second operation timing, the second processor adjusts the intervals of the scavenging promotion discharge in accordance with a temperature of the pre-combustion chamber.

8. A control method for an internal combustion engine including a pre-combustion chamber having at least one orifice, a spark plug located at the pre-combustion chamber, an ignition coil for providing high voltage to the spark plug, and a main combustion chamber to which combustion flame is jetted from the at least one orifice, the combustion flame being obtained through combustion of fuel gas introduced into the pre-combustion chamber by spark discharge generated at the spark plug with the high voltage provided from the ignition coil, the control method being for controlling an operation of the ignition coil of the internal combustion engine, the control method comprising the steps of:
controlling the operation of the ignition coil at an ignition timing when the fuel gas is compressed, to generate the spark discharge at the spark plug, thus combusting the fuel gas; and
in a period after the step of combusting the fuel gas and before fresh fuel is next introduced into the pre-combustion chamber, controlling the operation of the ignition coil to generate scavenging promotion discharge at the spark plug, thus scavenging an inside of the pre-combustion chamber, wherein
in the step of scavenging the inside of the pre-combustion chamber, discharge intervals of the scavenging promotion discharge are adjusted in accordance with a temperature of the pre-combustion chamber.

9. The control method for the internal combustion engine according to claim 8, further comprising the step of reading a table including timings, intervals, and the number of times of the scavenging promotion discharge set in advance in association with an operation condition of the internal combustion engine, wherein
in the step of scavenging the inside of the pre-combustion chamber, the scavenging promotion discharge is generated in accordance with the table.

10. A control device for an internal combustion engine including a pre-combustion chamber having at least one orifice, a spark plug located at the pre-combustion chamber, an ignition coil for providing high voltage to the spark plug, and a main combustion chamber to which combustion flame is jetted from the at least one orifice, the combustion flame being obtained through combustion of fuel gas introduced into the pre-combustion chamber by spark discharge generated at the spark plug with the high voltage provided from the ignition coil, the control device being for controlling an operation of the ignition coil of the internal combustion engine, the control device comprising:
a first processor which controls operation of the ignition coil to generate the spark discharge at the spark plug, thus combusting the fuel gas, at a first operation timing of the ignition coil; and
a second processor which controls operation of the ignition coil at a second operation timing of the ignition coil based on an intake air pressure of the internal combustion engine, to promote scavenging of the pre-combustion chamber,
wherein the second processor adjusts a number of times of scavenging promotion discharge based on the intake air pressure of the internal combustion engine.

* * * * *